July 17, 1928.
A. WITTIG
CHAMBER POT
Filed Nov. 6, 1926
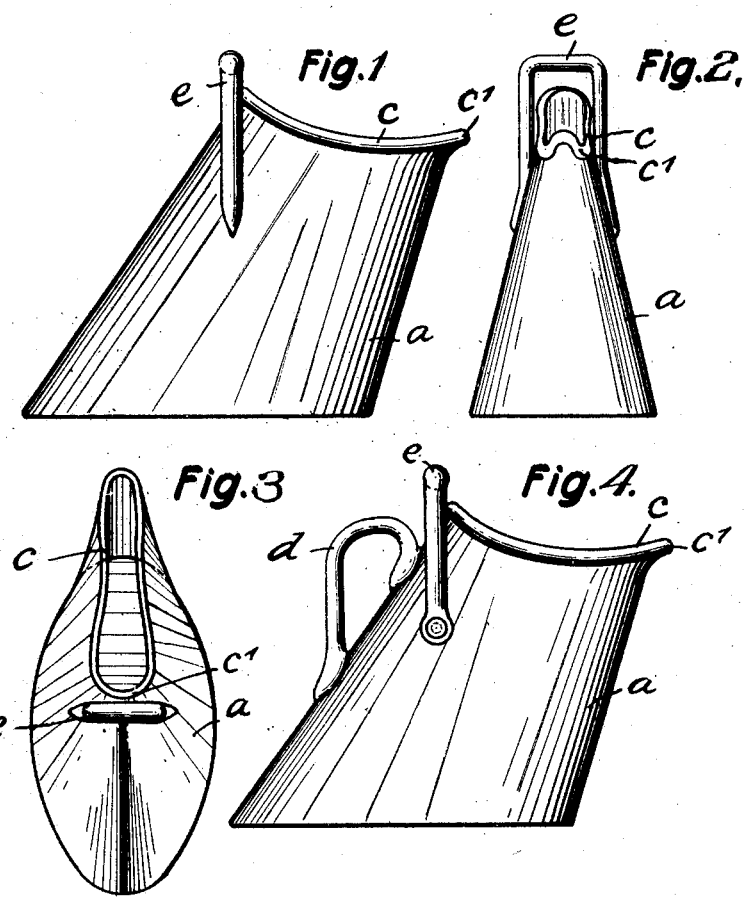
Inventor:
Auguste Wittig Patented July 17, 1928.

1,677,223

UNITED STATES PATENT OFFICE.

AUGUSTE WITTIG, OF ECKERNFORDE, GERMANY.

CHAMBER POT.

Application filed November 6, 1926, Serial No. 146,798, and in Germany November 9, 1925.

The object of the present invention is to produce a chamber-pot which can be conveniently used by invalids or normally frail, corpulent or weak-kneed persons, particularly women either in a standing or sitting position and without assistance, and the invention consists in the provision of ewer-shaped, laterally flattened vessel having an elongated mouth which is contracted in the middle, the front end of the mouth rim being raised and extended to form a beak.

To facilitate the handling of the vessel, it may be formed with a base which supports the vessel in a forwardly inclined position so that the carrying handle can be arranged substantially over the center of gravity and yet be clear of the mouth.

Fig. 1 of the accompanying drawings represents a side view of one form of the vessel, Fig. 2, a front view of the same, Fig. 3, a top view, and Fig. 4, a side view showing a modification.

The chamber-pot consists of a ewer-shaped laterally flattened vessel $a$ provided with an elongated mouth $c$ which is contracted in the middle so as to allow the user to sit astride in comfort. The mouth is furnished with a wide rim which, at the front end of the mouth, is raised and extended to form a beak $c^1$.

If the effort of sitting down and rising is too great, the patient may hold the vessel by the handle $e$ and use it in a standing position. The vessel is formed with a base which supports it in a forwardly inclined position so that the mouth, whether the vessel is full or empty, remains practically outside the center of gravity with the bottom horizontal. A handle $e$ is disposed transversely of the mouth and is connected to the vessel, either rigidly or hingedly, so as to be clear of the mouth and above the center of gravity. Constructed in this manner, the vessel, while carried by the handle, will remain substantially in its normal inclination. To facilitate the emptying of the vessel, the usual handle $d$ may be employed in addition to the handle $e$, as shown in Fig. 4.

The vessel may be made of any suitable material, such as china, earthenware, clear or coloured glass, galvanized, tinned or enamelled iron, copper or aluminum as well as compressed paper. If the material is thin, the vessel may be impressed with strengthening ribs. The height and general size of the vessel is chosen according to requirements. For the use of children a smaller size may be provided.

The vessel is particularly suitable for use by weak or invalid women the nursing of whom will thus be greatly facilitated.

I claim:

1. A chamber-pot in the form of a laterally flattened ewer having an elongated mouth which is contracted in the middle, the front end of said mouth being raised and extended to form a beak, a base which supports the pot in a forwardly inclined position, and a handle connected to the pot so as to be clear of the mouth and so that the pot, when suspended on the handle, remains substantially at its normal inclination.

2. A chamber-pot in the form of a laterally flattened ewer having an elongated mouth which is contracted in the middle, the front end of said mouth being raised and extended to form a beak, a base which supports the pot in a forwardly inclined position, and a carrying handle arranged transversely of the mouth so as to be clear of the latter and so as to maintain the pot substantially at its normal inclination.

In testimony whereof I have signed my name to this specification.

AUGUSTE WITTIG, née REUSCH.